Figure 1:
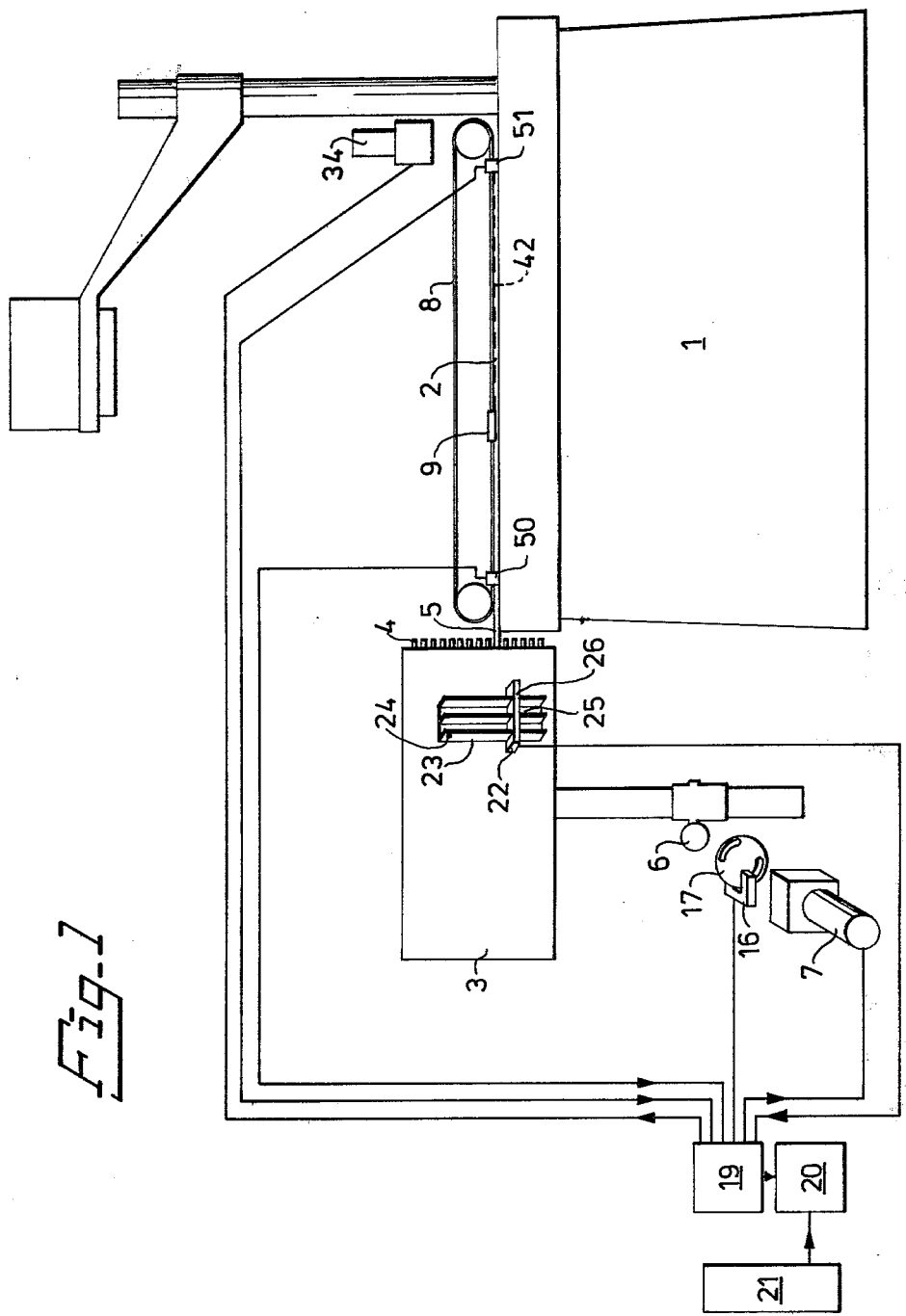

United States Patent [19]

Lindqvist

[11] 4,264,158
[45] Apr. 28, 1981

[54] PICTURE CHANGER FOR LARGE-SCALE PICTURE PROJECTOR

[76] Inventor: Inger Lindqvist, Blåeldsvägen 106, 175 60 Järfälla, Sweden

[21] Appl. No.: 14,767

[22] Filed: Feb. 23, 1979

[30] Foreign Application Priority Data

Mar. 3, 1978 [SE] Sweden ............................... 7802475

[51] Int. Cl.³ ............................................. G03B 23/00
[52] U.S. Cl. .............................. 353/118; 353/DIG. 5
[58] Field of Search ............... 353/27 A, DIG. 5, 118

[56] References Cited

U.S. PATENT DOCUMENTS

| | | | |
|---|---|---|---|
| 2,898,807 | 8/1959 | Ewald | 353/118 |
| 3,269,261 | 8/1966 | Porter | 353/DIG. 5 |
| 3,528,735 | 9/1970 | Bluitt et al. | 353/27 A |
| 3,743,400 | 7/1973 | Haning et al. | 353/27 A |
| 4,087,005 | 5/1978 | Kinsinger et al. | 353/27 A |
| 4,120,573 | 10/1978 | Johnston | 353/27 A |

*Primary Examiner*—Steven L. Stephan
*Attorney, Agent, or Firm*—Le Blanc, Nolan, Shur & Nies

[57] ABSTRACT

A picture plate changer for changing pictures projected with a large scale picture projector, e.g., overhead type projectors projecting a single picture from an entire picture plate. A magazine stores the picture plates as a stack of flat plates or plexiglass each placed in horizontal slots or tracks in the changer. The stack of plates are vertically shiftable to selected disposition so that a desired entire picture is accurately indexed to a location just above the level of the projector plate and interconnectors on each frame selectively cooperate with a mechanism which can engage and shift a selected picture and frame from the magazine to the projector and back. Power mechanisms and control means are shown to enable selection and operation of the changer in a pre-determined manner. Devices on the changer and the picture plates assure accurate positioning for projectors.

2 Claims, 4 Drawing Figures

PICTURE CHANGER FOR LARGE-SCALE PICTURE PROJECTOR

BACKGROUND OF THE INVENTION

This invention relates to a picture changer for large-scale picture projectors, which latter term is to be understood to refer to a projector, in the upper surface of which a transparent plate is provided, through which light is transmitted from a light source in the projector. A large-scale picture of slide type or a transparent film with figures or text applied thereon is applied for use directly on said plate, and the picture is projected on a wall or the like. Colloquially, projectors of this kind mostly are called over-head projectors.

The normal picture changing procedure at these projectors is that a person manually changes the pictures where every picture is a film of about the same size as the plate. There exist also projectors, at which a long film is wound on a first reel at one end of the plate and can be rolled up on a second reel at the opposite end of the plate. Film can thus be advanced across the plate. Also this feed, however, is carried out manually.

The present invention relates to a picture changer of the aforesaid kind for large-scale picture projectors where every picture is a discrete picture and, thus, is not stored in a successive order on a long film.

OBJECTS OF THE INVENTION

The picture changer according to the invention is characterized in that it comprises a magazine for picture plates which, when the changer is attached on or at a large-scale picture projector, is located outside said plate, and in which magazine picture plates are stored in a plane in parallel with or substantially coinciding with the plane of the plate, and that an adjusting device is provided to adjust the position of the magazine so that a certain picture plate is positioned in parallel with and slightly above the plane of the plate at one of the plate sides, and a drawing means is provided to seize said certain picture plate and to draw it across said plate and also to push the picture plate from the plate into the magazine.

Figure 2:
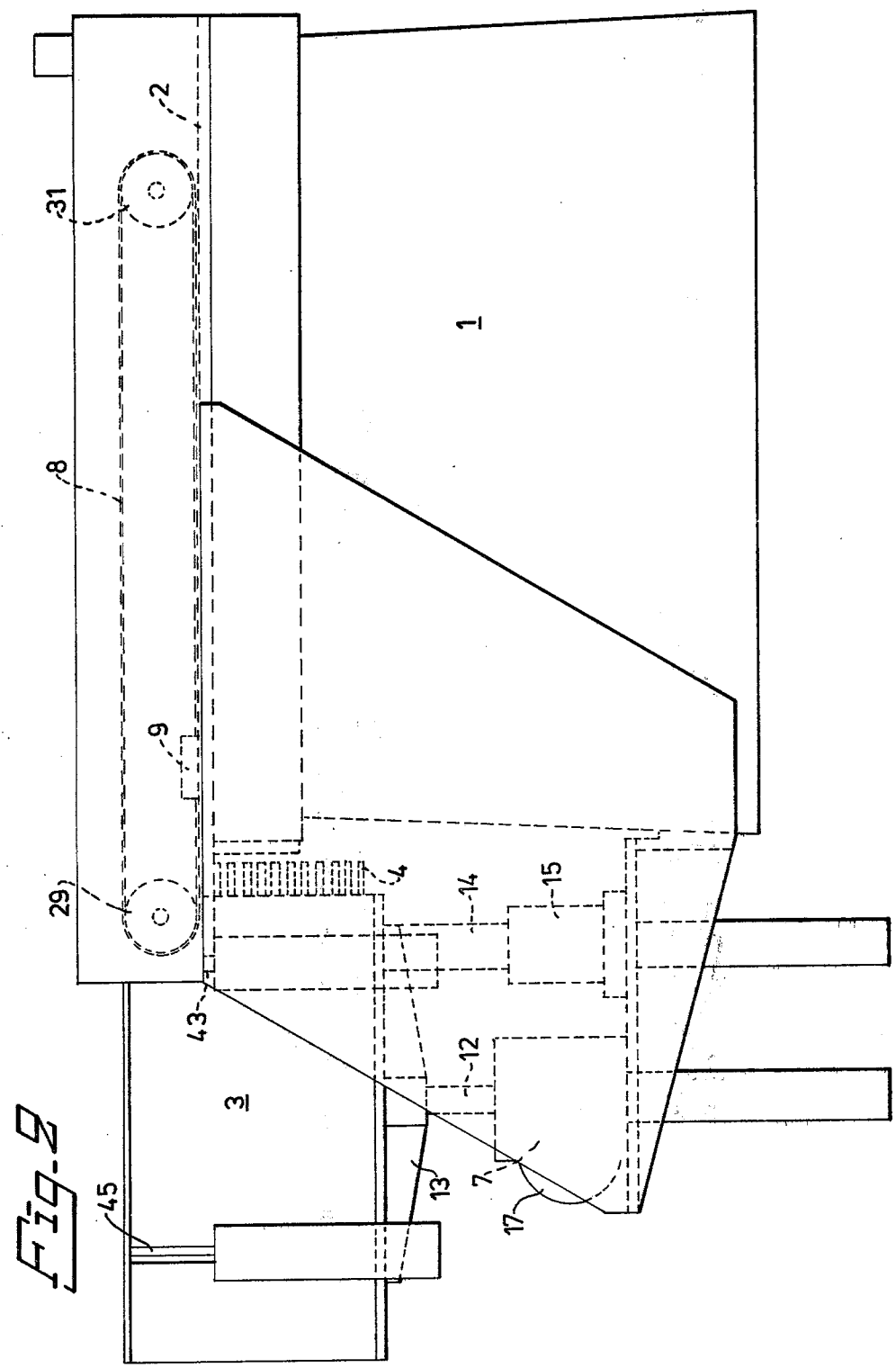
Figure 3:
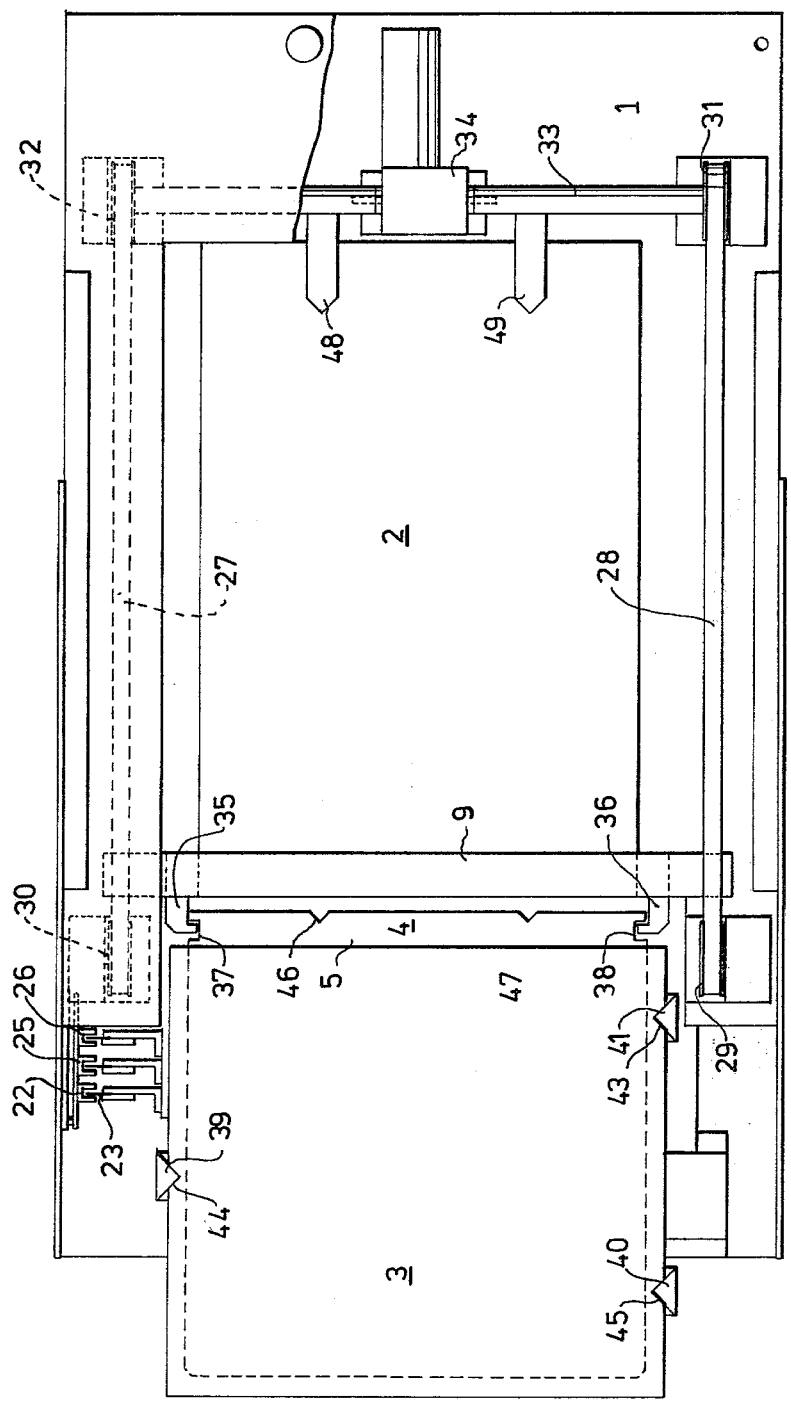
Figure 4:
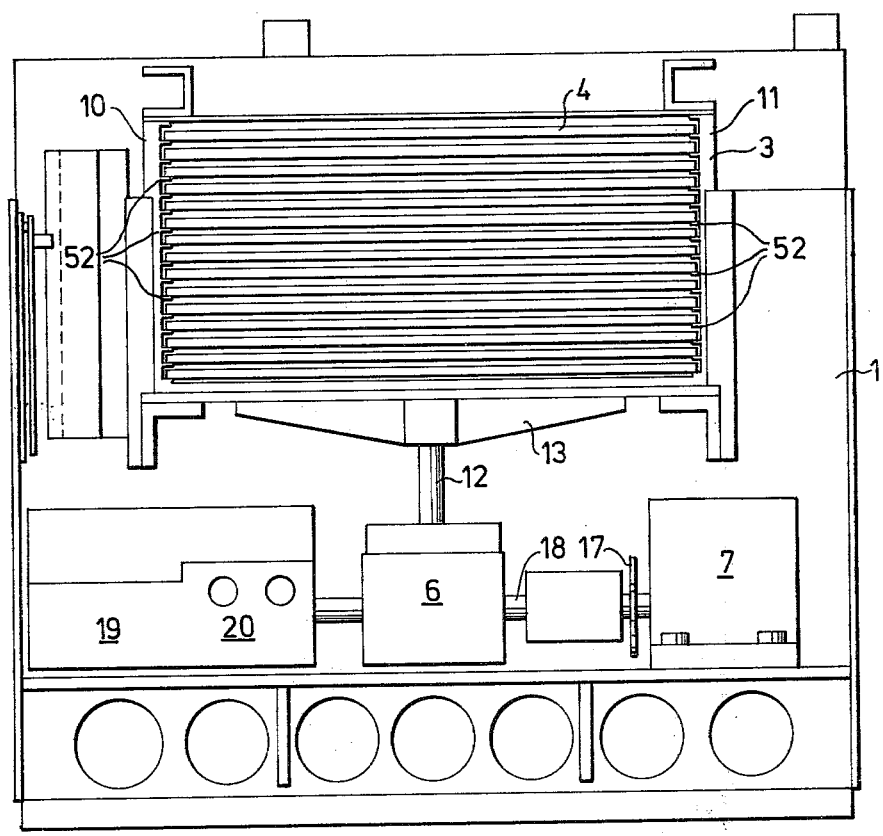

The invention is described in greater detail in the following, with reference to the accompanying drawings, in which FIG. 1 in a schematic manner shows the basic outline of the changer attached to a large-scale picture projector, inclusive of a schematic electronic block diagram, FIG. 2 is an enlarged side view of the changer and projector apparatus shown in FIG. 1, but in greater detail, FIG. 3 shows the changer and projector apparatus according to FIG. 2 seen from above, FIG. 4 shows the left end view of the changer shown in FIG. 2.

In FIG. 1, a large-scale picture projector 1 of known type is shown, which is provided with an upper horizontal transparent plate 2.

The picture changer comprises a magazine 3 for picture plates 4 located outside said plate 2. The picture plates 4 are stored in the magazine 3 in a plane in parallel with or substantially coinciding with the plane of the plate 2. An adjusting device comprising a lifting means 6 operated by a first electric motor 7 is provided to adjust the position of the magazine 3 in vertical direction so that a certain desired picture plate 4 is positioned in parallel with and slightly above the plane of the plate 2 at one edge thereof. The changer further comprises a drawing means 8 with a bar 9, which is in parallel with said edge of the plate 2 and can be moved perpendicularly to the longitudinal direction thereof across the entire plate 2 or the greater part thereof. The drawing means 8, as will become apparent hereinafter, is intended to seize a picture plate 4, the position of which is adjusted as the picture 5 in FIG. 1, and to draw said plate 4 over said plate 2 to the position 42 indicated by dashed lines in FIG. 1. The drawing means 8 also in intended to push the picture 4 off the plate 2 into the magazine 3.

The magazine 3 consists of a box-shaped body, in which a number of mutually parallel grooves 52 are provided in two opposite walls 10, 11. The picture plates 4 are inserted into said grooves and, thus, are stored in parallel with each other in the magazine 3. See FIG. 4. In each groove are located two leaf springs (not shown) which are intended to abut a picture plate in order to prevent it from sliding out of the magazine when the magazine is being handled or transported.

Said picture plates consist of a transparent plate, preferably of plexiglass, on which or in which a transparent film is attached, the picture and/or text of which is to be shown. The picture plates may also consist, for example, of known plastic frames with or without transparent material in the area defined by the frame.

The adjusting means, as mentioned, comprises a first electric motor 7 for operating a lifting means 6, which comprises a rod 12 supporting a lifting table 13, on which the magazine 3 is intended to rest. A vertical guide rod 14 preferably is provided, which is mounted in a bushing or a bearing 15 and secured on the lifting table 13. The object of said guide rod is to eliminate play in the lifting means 6. See FIG. 2.

A revolution indicator, preferably comprising a reading fork 16 and a perforated disc 17, is connected to the shaft 18 between the motor 7 and the lifting means 6. Said revolution indicator 16,17 is intended to emit pulses to an electronic computer of known type when the light source of the reading fork 16 shines through a hole in the perforated disc 17 on the light-sensitive means of the reading fork. Said computer 19 is connected to an electronic memory unit 20 of known type, to which electronic circuits 21 are connected for storing a figure corresponding to a desired picture 4. The computer 19 is capable to emit a signal, which via possible circuits or relays causes the motor 7 to stop when the indicator 16,17 has emitted the number of pulses corresponding to said figure.

In order to provide the computer with a reference figure at a certain position of the magazine 3 in relation to the plate 2, a reading fork 22 is mounted stationary relative to the plate, and a metal sheet 23 associated with said fork is mounted on the lifting table. At a certain prevailing height position of the magazine 3, the reading fork emits an impulse to the computer 19, which thereby is set for a value predetermined for said height position. Said impulse is emitted when the metal sheet 23, which is provided with a hole 24, is moved relative to the reading fork to a position, in which the reading fork emits light through said hole 24. The metal sheet and the reading fork are so positioned that this light emission preferably takes place when the magazine 3 is in its lower position. Said lower position corresponds substantially to the position, at which the uppermost picture plate in the magazine is located in the plane of the plate 2. The changer preferably automatically feeds the magazine 3 down to its lower position when the changer is applied for obtaining said reference figure. Alternatively several reading forks 25,26 can be attached, which identify other positions and, therewith, other reference figures.

The aforesaid drawing means 8 comprises a belt, screw rod or the like, which is located on each side of the plate 2, and on which said bar 9 is secured. According to a preferred embodiment, the belts 27,28 are toothed belts, each running over two pulleys 29,30,31,32, which are so located that each belt 27,28 runs along long sides of the plate 2. The two pulleys 29,30 located closest to the magazine 3 are not driven. The two remaining pulleys 31,32 are mounted fixed on a common shaft 33, which is driven by a second electric motor 34. When the motor 34 drives the belts 27,28, thus, the bar is moved across the plate 2. Owing to the reversibility of the motor, the bar 9 can be moved in both directions across the plate 2.

Grips 35,36 are attached to the bar 9 and project in the direction to the magazine 3. Every picture plate 4 is provided at its forward portion with a recess 37,38 in each of its two opposed long sides, into which recesses the grips 35,36 are intended to be inserted by movement of the magazine perpendicularly to the plane of the picture plate, whereby the picture plate 4 is moved relative to the stationary grips 35,36. When several picture plates are stored in the magazine, thus, the recesses form two vertical grooves extending perpendicularly to the plane of the picture plates.

When the magazine 3 is positioned in place, the bar 9 has been moved to its end position closest to the place of the magazine. The magazine 3 is inserted by lowering it vertically while vertical guide bars 39,40,41 attached to the lifting table 13 about vertical grooves 43,44,45 in the magazine walls. The magazine 3 is fitted into accurate position by means of the grooves and guide bars. At said lowering movement of the magazine 3 the grips are in the recesses 37,38 in the picture plates 4, as shown in FIG. 3 where the magazine at its insertion is moved down in the plane of the paper.

The grips 35,36 are located in a plane in parallel with the plane of the plate 2 and slightly above said plane, so that the grips 35,36 upon movement of the bar 9 away from the magazine seize the picture plate, which is adjusted to a position in parallel with and slightly above the plane of the plate 2 and pull the picture plate 4 onto the plate 2 to the position 42 dashed in FIG. 1.

In the forward edge of the picture plate 4 two V-shaped grooves 46,47 are provided, which are intended to be fitted to two guide pins 48,49, which are rigidly mounted on the changer at its end located farthest away from the magazine 3. Owing to said grooves and pins, a picture plate 4, which has been pulled across the plate 2 by the drawing means 2, is accurately adjusted with respect to its position on the plate 2.

A limit switch 50,51 is provided at each end position for the bar 9, i.e. at the end position closest to the magazine, and at the end position farthest away from the magazine. The switches 50,51 are connected directly to the computer 19 or to another suitable electronic device. According to the embodiment shown, also the second motor 34, for the drawing means, is connected to the computer, possibly via suitable electronic circuits. At said embodiment, the computer 19 comprises in addition to a counting mechanism a microcomputer or similar device constituting a logic control unit for the changer. The control units, of course, can be modified substantially without abandoning the invention idea. According to a preferred embodiment it is possible to store in the storage circuit 21 a figure by means of a keyboard, which figure constitutes an identification code for a certain picture plate.

It is, of course, also possible to replace details of said control units by known control units for usual slide projectors. The picture changer according to the invention operates as follows.

The picture magazine 3 is charged with the desired number of picture plates 4 with attached film. The magazine 3 is lowered in the guide bars 39,40,41 of the lifting table until it comes to rest against the lifting table 13. It is assumed that a picture 5 is desired to be shown. A figure corresponding to the picture 5 is stored in the circuit 21, which stores the figure in the memory 20. Hereby the computer 19 starts the motor for the lifting means 6, which guided by pulses emitted from the reading fork 16 to the computer adjusts the height of the magazine so that the picture 5 lies in a plane in parallel with and slightly above the plane of the plate 2. When the picture 5 is in correct height position, the motor 7 is stopped by the computer 19, whereafter the motor 34 of the drawing means is started by the computer 19, so that the grips 35,36 pull the picture plate with the picture 5 out of the magazine until the guide pins 48,49 abut the grooves 46,47 in the forward edge of the picture plate 4. Hereby the remote limit switch 51 is actuated, which emits an impulse to the computer 19, which stops the motor 34. When the picture is desired to be returned to the magazine 3, such an instruction is fed in by the feed-in circuit 21, and the computer starts the motor 34 of the drawing means in that direction that the grips move toward the magazine and thereby push the picture plate into the magazine.

When the picture plate has been inserted, the limit switch 50 located closest to the magazine is actuated and emits an impulse to the computer 19, which stops the motor 34. When the next picture is desired to be shown and, respectively, removed, the above respective procedure is repeated.

The present invention, thus, constitutes a very valuable auxiliary means at the operation of large-size picture projectors.

Only one embodiment has been described above, but other embodiments can be imagined. The magazine, for example, may be circular, with the picture plates stored radially in grooves. The adjusting means then is designed to rotate a shaft through the magazine so that the desired picture is adjusted in the plane of the plate 2 and slightly above the same.

The drawing means can be modified as well as the control means, such as the reading forks and, respectively, limit switches, which can be replaced by microswitches and, respectively, current-sensing means for the current supply circuit of the second motor for sensing that the current intensity increases when the bar is stopped against a stop member, whereby also the motor is stopped mechanically.

The invention, thus, must not be regarded restricted to the embodiment described above, but can be varied within the scope of the attached claims.

I claim:

1. A picture changer as an auxiliary mechanism for use with and adapted to be attached on a large-size picture projector which on its upper surface is provided with a transparent projector plate through which light from a light source in the projector is transmitted, wherein said changer comprises: a magazine for picture plates, said magazine disposed to one side and outside one edge of said projector plate when the changer has been attached on a large size picture projector; in said magazine, a plurality of flat picture plates are stored in a fixed position relative to the magazine; said changer includes an adjusting means, with a lifting means having a lifting table upon which said magazine is removably located and positioned, provided to vertically lift and lower and selectively adjust the vertical disposition of the magazine so that any specific selected picture plate in the magazine is positioned in parallel with and slightly above the plane of the projector plate at one of the sides of the projector plate; a drawing means is provided to seize a selected said picture plate and pull it across and to a specific indexed position over said projector plate and also to push that selected picture plate from its position over the projector plate back into its storage position in the magazine; said drawing means includes an elongated bar which is parallel with the forward edges of said picture plates and adapted to be located above the plane of the projector plate and is movable perpendicular to its longitudinal dimension in a path parallel to and across the top of the projector plate; a pair of grip means are disposed on said bar, one grip means adjacent each end of said bar; each said picture plate, adjacent its forward portion being provided with a recess in each of its two opposed side edges, into which recesses said draw bar grip means are interfitted by movement of said magazine perpendicularly to the planes of the picture plates whereby a selected picture plate is moved to a position at which it is seized on two edges by said grip means; spaced apart indexing guide means on the changer; spaced apart cooperating index means on the front edge of each picture plate adapted to abut said indexing guide means and accurately locate said picture plate in a projecting position in said changer above the projector plate; said adjusting means comprises an electric motor and rotatable drive shaft for driving the lifting means and therewith for moving the lifting table and magazine to a desired position; a revolution indicator provided to indicate the number of revolutions, of said rotatable shaft, said revolution indicator being adapted to emit and transfer pulses related to said shaft revolution; control means include an electronic computer receiving said pulses and an electronic memory unit with electronic circuits for storing a figure representative of a predetermined plate location in said magazine said computer being capable to emit a signal when said indicator has emitted the number of pulses corresponding to said stored figure, which signal causes said motor to stop; and means with a reading fork are provided for reading a predetermined height position of the magazine, said fork sensing said height positions and adapted to emit an impulse to said computer when said height prevails, by which impulse the computer is set for a value predetermined for said height position.

2. A picture changer as defined in claim 1, wherein said picture plate consists of a transparent plastic plate, and a transparent single picture film, the picture or text of which is to be shown, is attached to said plastic plate.

* * * * *